Sept. 20, 1955 E. M. STAPLES 2,718,589

RADIO RELAY SYSTEM

Filed June 29, 1950 5 Sheets-Sheet 1

INVENTOR
E. M. STAPLES
BY B. F. Stoddard
ATTORNEY

INVENTOR
E. M. STAPLES
BY B. J. Stoddard
ATTORNEY

Sept. 20, 1955 E. M. STAPLES 2,718,589

RADIO RELAY SYSTEM

Filed June 29, 1950 5 Sheets-Sheet 3

INVENTOR
E. M. STAPLES
BY B. H. Stoddard
ATTORNEY

INVENTOR
E. M. STAPLES
BY [signature]
ATTORNEY

Sept. 20, 1955 E. M. STAPLES 2,718,589

RADIO RELAY SYSTEM

Filed June 29, 1950 5 Sheets-Sheet 5

INVENTOR
E. M. STAPLES

BY B. T. Stoddard
ATTORNEY

United States Patent Office 2,718,589 Patented Sept. 20, 1955

2,718,589

RADIO RELAY SYSTEM

Elliot M. Staples, Hohokus, N. J., assignor to Bell Telephone Laboratories, Incorporated, New York, N. Y., a corporation of New York Application June 29, 1950, Serial No. 171,044

4 Claims. (Cl. 250—15)

This invention relates to radio relay signaling systems and, more particularly, to multichannel microwave radio relay signaling systems.

In such systems, it is desirable to provide routing means at radio relay stations for selectively routing signals received over any one of a plurality of microwave radiant energy channels for retransmission over an auxiliary radiant energy channel simultaneously with their retransmission over a regular microwave radiant energy channel. It is also desirable, in the event of a failure of a communication channel, to route received signals, normally assigned for retransmission over the now impaired channel, to a different channel for transmission thereover. These routing operations can be best effected at some point in the intermediate frequency stages of the respective radio relay stations. Since the signals in these intermediate frequency stages have frequencies of the order of 70 megacycles, conventional routing means employing electromechanical devices, such as relays, cannot be used satisfactorily. This is due to the fact that, when these devices are used with signals having frequencies within the megacycle range, there is such a high degree of capacity coupling between the armatures and open contacts of the devices as to create virtually closed circuit conditions for the signals thereby destroying the selectivity of the routing means.

Accordingly, it is an object of this invention to provide selective routing means at stations in a microwave radio relay system for routing signals having frequencies within the megacycle range.

It is also an object of the invention to provide routing means at radio relay stations in a multichannel radio relay system for selectively routing signals received over any one of the incoming channels for retransmission over an auxiliary outgoing channel simultaneously with their retransmission over a regular outgoing channel.

An additional object is to provide control means for establishing by a single actuation thereof an electric transmission path simultaneously through each rank of a pyramidal routing circuit for the purpose of coupling any one of a plurality of signaling channels to a utilization circuit.

These and other objects of the invention are accompilshed in a multichannel microwave radio relay signaling system by providing the individual radio relay stations with routing means comprising a plurality of electronic selector units disposed in several ranks, the number of selector units in each successive rank diminishing progressively, and constituting a pyramidal formation having only one selector unit at its apex. Each selector unit includes two input circuits and a single output circuit. Each of the selector units is so designed as to normally introduce high attenuation between both of its input circuits and its single output circuit. The input circuits of the selector units in the rank constituting the base of the pyramidal formation are each coupled to a different incoming signaling channel at the associated relay station. The single output circuit of each selector unit in the rank at the base of the pyramid is coupled to one of the two input circuits of a selector unit in the next succeeding rank, each of these output circuits being coupled to a different input circuit. This coupling arrangement is duplicated for all the selector units in each of the ranks except that the single selector unit at the apex of the pyramidal formation has its output circuit coupled to a utilization circuit which may, in turn, be coupled to auxiliary retransmission means.

Control means are provided for selectively establishing any one of a plurality of available transmission paths through the pyramidal formation of selector units for the purpose of coupling any one of the incoming signal channels to the utilization circuit, only one such transmission path being established at any one time. The desired transmission path is established by selectively operating the control means to effect the actuation of only one selector unit in each rank to couple only one of its two input circuits to its single output circuit with substantially zero attentuation. The time required for establishing such a transmission path is reduced to a minimum by causing the control means to effect the actuation of all the desired selector units substantially simultaneously.

In a preferred embodiment of the invention, each selector units consists of two thermionic amplifiers each having a single input circuit, the two input circuits of each pair of amplifiers constituting the two input circuits to each selector unit. Each amplifier has a single output circuit, the two output circuits of each pair of amplifiers being coupled together to constitute the single output circuit of each selector unit. Not more than two amplifiers are coupled together because all of the coupling conductors associated with the amplifiers are made as short as is possible in order to avoid undesired capacity effects that are liable to be produced when energy in the megacycle range is transmitted over a conductor of any appreciable length. Each amplifier is designed to present either a high-loss impedance or, alternatively, a substantially zero loss impedance to applied signaling energy having frequencies in the megacycle range. All of the amplifiers are normally biased to the high-loss condition by biasing potentials supplied from external circuits.

When it is desired to establish a transmission path through a particular amplifier, a relay is energized to substitute a different biasing potential for placing the amplifier in the low-loss condition. In order to increase the speed of operation, the biasing potentials for all the amplifiers in any one transmission path are switched substantially simultaneously by only one relay, there being one relay for each transmission path through the pyramidal formation of amplifiers. The circuits associated with the relays are connected in such a manner as to prevent the establishment of more than one transmission path at any one time. Thus, during operation, a change from one transmission path through the pyramidal formation of amplifiers to another such path is quickly effected by simply energizing only one relay.

These and other features of the invention are more fully discussed in connection with the following detailed description of the drawing, in which.

Figure 1:
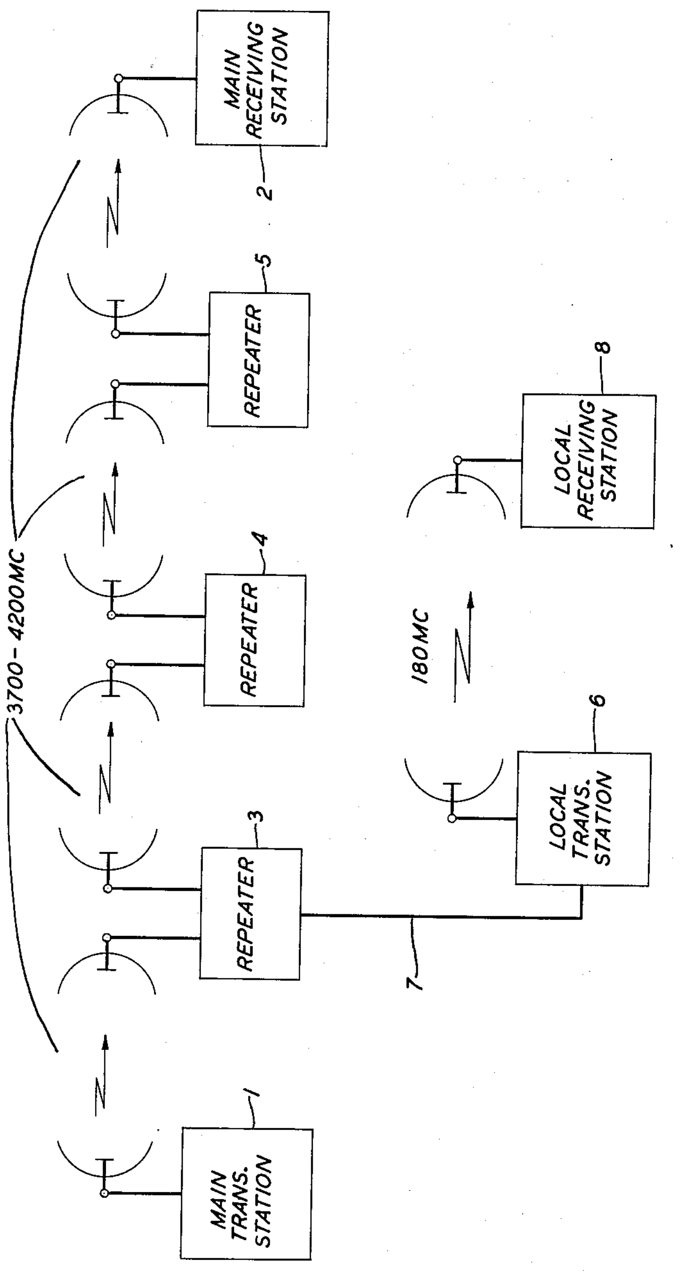
Fig. 1 is a block diagram of a microwave radio relay signaling system having supplementary transmitting means associated with one of the relay stations for retransmitting signals over an auxiliary radiant energy channel.

In Fig. 1, a multichannel microwave radio relay signaling system is shown to include at one terminal a main radio transmitting station 1 for transmitting radiant energy signals over a plurality of signaling channels each having a different mean frequency lying within that portion of the frequency spectrum which extends from 3700 megacycles to 4200 megacycles. The other terminal of the system is constituted by a main radio receiving station 2. Since the receiving station 2 is located a considerable distance from the transmitting station 1 and since the line-of-sight method of transmission is employed, the system also includes a number of radio relay, or repeater, stations 3—4—5 of the type shown in Fig. 2.

Figure 2:
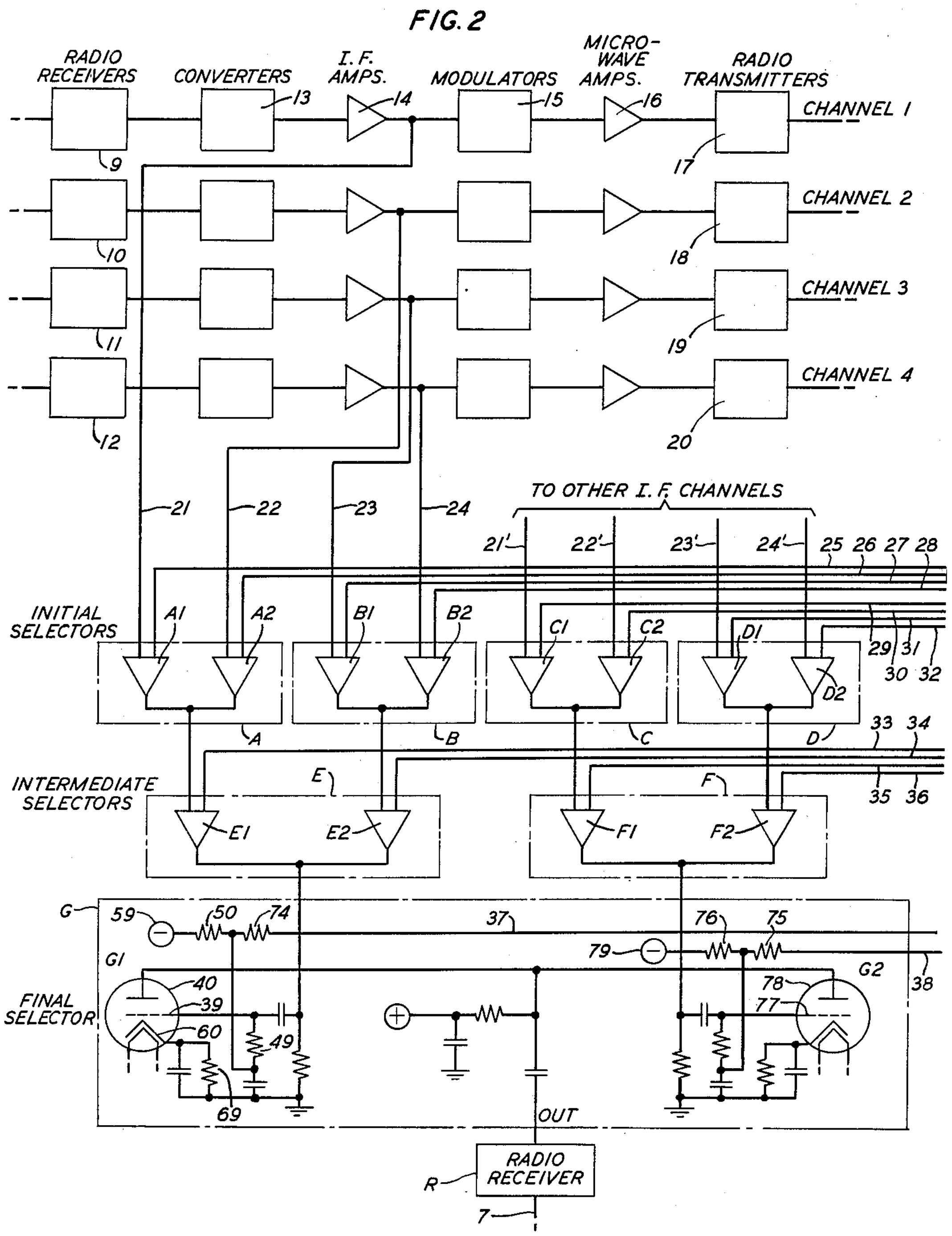
Fig. 2 is a schematic representation of a portion of the equipment at a relay station.

As can be seen in Fig. 2, each of the relay stations 3—4—5 includes a receiving portion comprising a plurality of microwave radio receivers 9—10—11—12, each tuned to a different one of the signaling channels for receiving the microwave signals. Each relay station also includes a transmitting portion comprising a plurality of microwave radio transmitters 17—18—19—20, one for each signaling channel, for retransmitting the signals to the next relay station or, in the case of the last relay station 5, to the terminal receiving station 2. The output of each of the radio receivers 9—10—11—12 is coupled to the input of its respective associated radio transmitter 17—18—19—20 through converter, modulator, and amplifier units.

Since the coupling units in each channel are essentially alike, their nature can be understood by considering, as an example, those associated with the uppermost channel indicated in Fig. 2. In this example, the output from the radio receiver 9 is coupled to the input of a converter 13 which reduces the received signals to intermediate frequencies within that portion of the frequency spectrum which extends from 60 megacycles to 80 megacycles. These intermediate frequency signals are amplified by an amplifier 14 and are then applied to a transmitter-modulator 15 which reconverts them from the megacycle frequency range to the microwave frequency range. The resulting microwave signals are amplified in an amplifier 16 having its output coupled to the input of the radio transmitter 17.

Referring again to Fig. 1, it can be seen that the relay station 3 is coupled by a transmission line 7 to a local transmitting station 6 which is designed to transmit radiant energy signals over an auxiliary signaling channel in a low portion of the megacycle frequency range, such as that centering around 180 megacycles. The signals radiated from the transmitting station 6 are received at an associated local receiving station 8 or, if desired, at a number of similar local receiving stations, such as home radio and television receivers. It is to be understood that any of the other repeater stations 4—5 may be coupled to similar local radio transmitting stations.

Signals radiated from the main transmitting station 1 over any one of the plurality of microwave signaling channels may, after being received at the repeater station 3, be routed over the transmission line 7 to the local transmitting station 6 for retransmission therefrom over the auxiliary signaling channel to the local receiving station 8 substantially simultaneously with their retransmission from the repeater station 3 over a microwave signaling channel to the associated repeater station 4. Such routing of the signals is performed by the routing circuit shown in Figs. 2 and 3.

In Fig. 2, the routing circuit at the repeater 3 is shown to comprise a pyramidal formation of electronic selector units A—B—C—D—E—F—G disposed in three ranks for forming an inverted pyramid having its base toward the top of the figure and its apex at the bottom. The rank at the base of the pyramidal formation is constituted by four selector units A—B—C—D, each comprising a pair of thermionic amplifiers A1—A2, B1—B2, C1—C2, and D1—D2, respectively. Each of these amplifiers has a single input circuit, the input circuits of the amplifiers A1—A2—B1—B2 being coupled by conductors 21—22—23—24, respectively, to the output circuits of the intermediate frequency amplifiers associated respectively with radio receivers 9—10—11—12 in the receiving portion of the relay station 3.

Since, in this particular embodiment of the invention, the radio relay system of Fig. 1 is to be understood as employing eight signaling channels, it necessarily follows that the receiving portion of the repeater 3 actually includes eight essentially similar receivers. Only four such radio receivers 9—10—11—12 have been represented in Fig. 2 in order to simplify the drawing. The other four radio receivers at the relay station 3 are coupled to their associated radio transmitters, also not shown, by essentially similar coupling units. Therefore, it is to be understood that the remaining four amplifiers C1—C2—D1—D2 in the initial rank have their input circuits coupled by the conductors 21'—22'—23'—24', respectively, to the output circuits of the intermediate frequency amplifier units associated with these other four radio receivers as is indicated in Fig. 2. It is also to be understood that the amplifiers in the initial rank need not necessarily be coupled to the output circuits of the intermediate frequency amplifiers but may, if desired, be coupled to any other suitable points in the intermediate frequency stages of the repeater station 3. In addition, it is to be noted that each of the amplifiers A1 to D1, inclusive, has a single output circuit and that the two output circuits for each pair of amplifiers A1 to D1, inclusive, are coupled together to provide a single output circuit for each of the initial selectors A—B—C—D. As was stated above, the outputs of no more than two amplifiers are connected in parallel so that the coupling conductors can be made as short as is possible. If the outputs of more than two amplifiers should be connected in parallel, this would require a longer coupling conductor which would be liable to produce undesired capacity effects since the signaling energy being routed has frequencies in the microwave range.

The second rank in the pyramidal formation of selectors is shown to include only two electronic selector units E—F, each comprising a pair of thermionic amplifiers E1—E2 and F1—F2, respectively. Each of these amplifiers in the intermediate selector units E—F has a single input circuit which is coupled to the single output circuit of its respective associated initial selector unit A—B—C—D. Each of these amplifiers E1—E2—F1—F2 has a single output circuit. The output circuits of the amplifiers E1—E2 are coupled together to form a single output circuit for the selector E and, similarly, the output circuits of the amplifiers F1—F2 are coupled together to form a single output circuit for the selector F.

The final electronic selector unit G at the apex of the inverted pyramidal formation of selector units includes two thermionic amplifiers G1—G2. Each of the amplifiers G1—G2 has a single input circuit which is coupled to the single output circuits of their respective associated intermediate selectors E—F. Each of the amplifiers G1—G2 also has a single output circuit, these two output circuits being coupled together to provide a single output circuit for the final selector G. In this embodiment of the invention, the single output circuit of the final selector unit G is coupled to the input circuit of a frequency modulation type of radio receiver R. Intermediate frequency signals thus supplied to the receiver R are converted therein to corresponding signals having frequencies in a lower portion of the frequency spectrum. It is to be noted that the output circuit of the receiver R is coupled by the transmission line 7 to the local transmitting station 6 which is shown in Fig. 1. Therefore, the converted signals of reduced frequency will be delivered over the transmission line 7 to the transmitting station 6 where they will be converted to higher frequency values for transmission therefrom in the form of radiant energy signals having frequencies in the megacycle range.

As all of the amplifiers A1 to G2, inclusive, are essentially similar, only the two amplifiers G1—G2 in the final selector unit G have been shown in detail in order to simplify the drawing. These amplifiers G1—G2 comprise thermionic tubes 40—78, respectively, each having an anode, control grid, cathode, and cathode heating filament. Associated with each of the tubes 40—78 are external circuits for supplying electric energy to their electrodes. Normally, these external circuits supply energy having such values and polarities as to bias the tubes 40—78 beyond cutoff with the result that the tubes 40—78 present a high-loss impedance to electric energy having frequencies centering around 70 megacycles. Since all of the other amplifiers A1 to F2, inclusive, are normally in a similar condition, all of the transmission paths through the pyramidal formation are normally blocked.

The external circuits are capable of applying different potentials to the amplifier tubes for rendering them conductive whereby they present substantially zero loss impedance to energy having frequencies centering around 70 megacycles. By properly applying these potentials to only one tube in each rank, an electric transmission path can be established through the pyramidal formation. Since, in this embodiment of the invention, the radio relay system employs eight signaling channels, the amplifiers are arranged to establish eight alternative transmission paths through the pyramidal formation, one such path being available for each signaling channel. In order to establish any desired one of the eight available transmission paths, the unblocking potentials are selectively applied to the amplifier tubes in response to the energization of the appropriate control relay in the group of control relays shown in Fig. 3.

Figure 3:
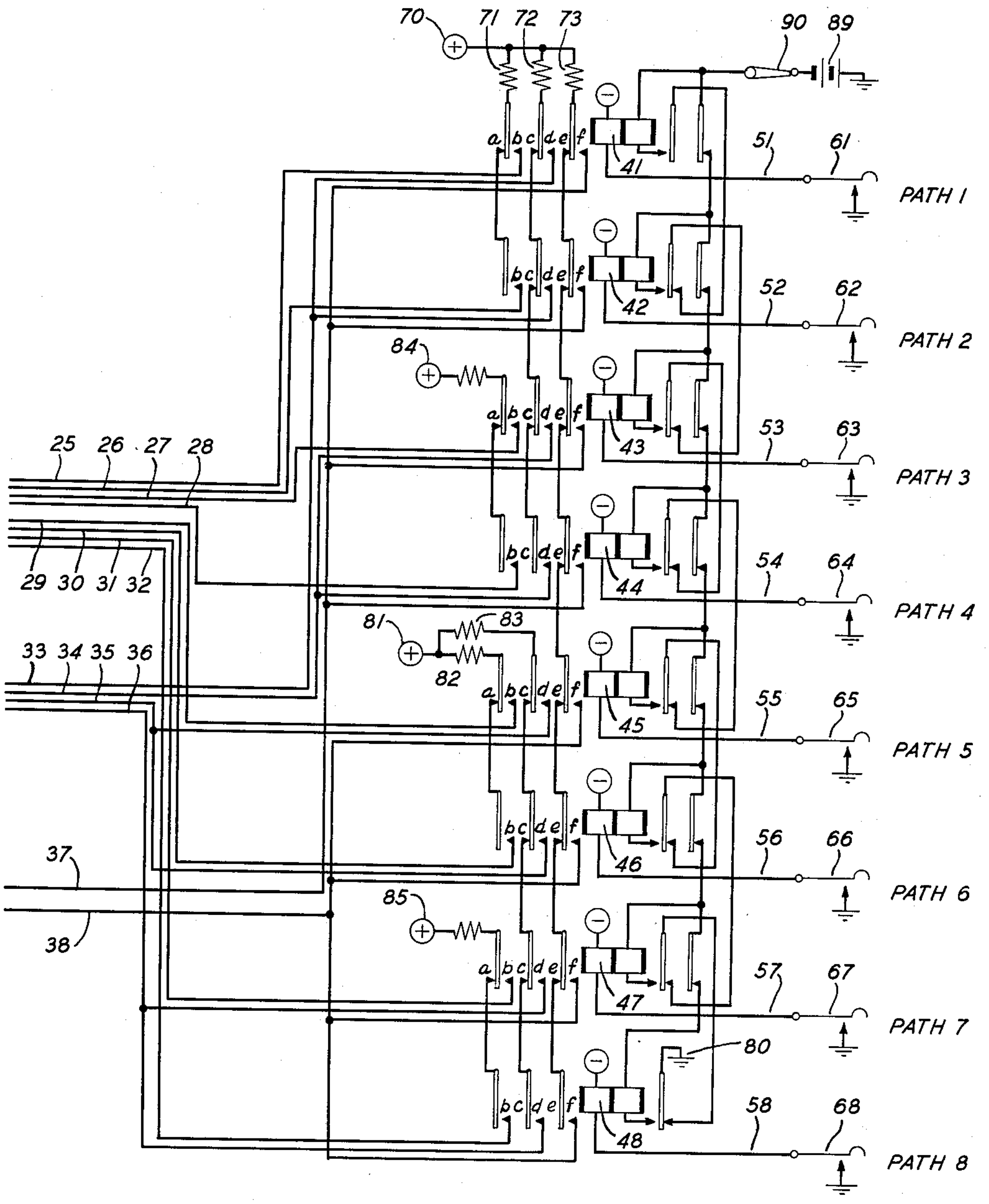
Fig. 3 is a circuit diagram of another portion of the equipment at a relay station.

In Fig. 3, a group of eight control relays 41 to 48, inclusive, one for each signaling channel, have one side of their operating windings connected to a source of negative potential, such as a 24-volt battery. The other side of these operating windings are coupled by conductors 51 to 58, inclusive, to eight non-locking keys 61 to 68, inclusive, one for each of the eight available transmission paths through the pyramidal formation. When any one of these manually operable keys 61 to 68, inclusive, is momentarily operated to engage its associated grounded contact, it thereby completes a circuit for energizing the operating winding of its respective associated control relay which thereupon moves its armatures into engagement with their inner contacts. Such actuation of the inner right armature of any one of the control relays 41 to 48, inclusive, closes an associated circuit for electric current from a suitable source, such as a 24-volt battery 89, to energize the holding winding of that relay to maintain its armatures operated.

This holding circuit extends from the battery 89, over its associated normally closed manual switch 90, and then over an obvious circuit through the holding winding of the energized control relay to ground 80. Consequently, the operated control key should be manually held in engagement with its associated contact for a brief interval of time sufficient to allow the holding circuit of its associated control relay to be closed. As soon as this occurs, the control key can be released since the associated control relay will now remain energized thereby holding its operated armatures in engagement with their inner contacts.

The armatures of this relay will stay operated until the switch 90 is manually operated to open the holding circuit or until another one of the control keys is manually actuated to engage its associated contact. The latter condition is due to the fact that the holding circuit for any one of the relays 41 to 48, inclusive, includes an armature and contact of each of the other relays. Consequently, when one of these other relays is energized in response to the closing of its associated control key, it will operate all its armatures thereby opening the holding circuit for the relay that was first energized and causing it to release its armatures. In addition, the operation of one of the armatures of the second energized relay effects the closing of a portion of the holding circuit for this relay. The holding circuit thus prepared for closure becomes completely closed as soon as the armatures of the now deenergized first relay move into engagement with their release contacts.

Thus, the actuation of any one of the control keys 61 to 68, inclusive, not only effects the energization of its respective associated control relay but also effects the deenergization of any other one of the control relays that may have been previously energized. Consequently, except for the very brief interval of time between the closure of the energizing circuit for one of the relays 41 to 48, inclusive, due to the operation of its respective associated control key, and the resulting opening of the holding circuit associated with a previously energized relay, there will be no other period of time when more than one of the control relays 41 to 48, inclusive, is energized.

When none of the control relays 41 to 48, inclusive, are energized, all of the thermionic amplifiers A1 to G2, inclusive, wil be in a non-conductive condition. Considering the amplifier G1 as an example, it can be seen that the circuit extending along its control conductor 37 is open at contacts $f$ of relays 41—42—43—44. Consequently, there is no current flowing in this circuit at this time and the only potential now applied to the grid 39 of the thermionic tube 40 is that derived through resistors 49 and 50 from a source 59 of negative potential having a magnitude of about 11 volts with respect to ground. It should be noted here that, in this routing circuit, the positive sides of all the negative potentials are coupled to ground, and, similarly, the negative sides of all the positive potentials are coupled to ground. Since the cathode 60 of the tube 40 is coupled through a resistor 69 to ground, there is no current flowing in the resistor 69 at this time, and, therefore, the grid 39 is biased 11 volts negative with respect to the cathode 60. This is sufficient to cause the tube 40 to be non-conductive in respect to the applied intermediate frequency signaling energy, as was stated above, so that the amplifier G1 may be considered as being disabled.

However, when an appropriate one of the control relays, such as relay 41, has been energized and has operated its armatures, a source 70 of positive potential having a magnitude of about 130 volts with respect to ground will be connected through a resistor 73, over the inner left operated armature and contact $f$ of relay 41, along conductor 37, through the resistors 74 and 50, and then through the negative 11-volt source 59 to ground. Closure of this series circuit permits current to flow from the grounded source 70 through the resistors 73—74—50, and then through the source 59 of opposing current to ground. The values of the resistors 73—74—50 are so selected as to produce a resultant potential of +9 volts at the junction point between resistors 50 and 74. Consequently, the bias voltage applied to the grid 39 will now be changed from −11 volts to +9 volts with respect to ground. The voltage drop in the resistor 69 when combined with this +9 volts potential results in the grid 39 being biased negatively with respect to the cathode 60 by the amount necessary for causing the tube 40 to present substantially zero loss impedance to the applied intermediate frequency signals, as was stated above, so that the amplifier G1 may now be considered as being enabled.

In a similar manner, the effective bias on the grid 77 of the tube 78 can be changed from −11 volts, normally applied by the negative 11-volt source 79, to a smaller negative value. For example, when the control relay 45 is energized, the +130 volts potential from the source 70 is applied through the resistor 73, over the contacts *e* of relays 41—42—43—44, over the contact *f* of relay 45, along conductor 38, and then through the resistors 75 and 76 to the −11 volt source 79. This results in the grid 77 being properly biased to condition the tube 78 for use as an amplifier of the applied intermediate frequency signals.

It is to be noted that the control lead 37 from the amplifier G1 terminates at the contacts *f* of the upper four control relays 41—42—43—44 and that the control lead 38 from the amplifier G2 terminates at the contacts *f* of the lower four control relays 45—46—47—48.

All of the other thermionic amplifiers A1 to F2, inclusive, in the routing circuit are provided with similar control leads 25 to 36, inclusive. It is to be noted that each of the control leads 25 to 32, inclusive, associated with the initial selectors A—B—C—D, terminates at only the contact *b* of its respective associated control relay as is shown in Fig. 3, but each of the control leads 33 to 36, inclusive, associated with the intermediate selectors E—F, terminates at the contacts *d* of a respective associated pair of control relays 41—42, 43—44, 45—46, and 47—48. Since all of these amplifiers A1 to F2 are essentially similar to the amplifiers G1 and G2, which are described in detail above, they are disabled when the relay contacts at the ends of their respective control leads 25 to 36, inclusive, are not engaged by their associated armatures and are enabled when their control leads 25 to 36, inclusive, are coupled to a +130-volt source. Thus, by selectively operating the control keys 61 to 68, inclusive, only one amplifier in each rank will be enabled.

All of the eight signaling channels employed by the radio relay system are coupled to the input circuits of the initial selectors A—B—C—D by the conductors 21 to 24', inclusive, as was explained above. Any one of these eight signaling channels can be routed through the pyramidal formation to the utilization circuit, represented by the radio receiver R and the transmission line 7, by enabling only one particular amplifier in each rank of the pyramidal formation of selector units, these amplifiers being enabled substantially simultaneously. The particular thermionic amplifiers that must be enabled in order to establish each of the eight available transmission paths through the pyramidal formations are indicated in the following table:

| Path | Input Coupling Conductor | Amplifiers to be Enabled |
|---|---|---|
| 1 | 21 | A1—E1—G1 |
| 2 | 22 | A2—E1—G1 |
| 3 | 23 | B1—E2—G1 |
| 4 | 24 | B2—E2—G1 |
| 5 | 21' | C1—F1—G2 |
| 6 | 22' | C2—F1—G2 |
| 7 | 23' | D1—F2—G2 |
| 8 | 24' | D2—F2—G2 |

The first path is established by energizing relay 41 in the manner described above to effect the operation of its armatures. The outer left armature will now engage contact *b* to apply the potential from the source 70 over lead 25 to cause amplifier A1 to be enabled. Similarly, the middle left armature will engage contact *d* to apply the potential from the source 70 over lead 33 to cause amplifier E1 to be enabled. Likewise, the inner left armature will engage contact *f* to apply the potential from the source 70 over lead 37 to cause amplifier G1 to be enabled. Since these armatures are all actuated at the same time, the amplifiers A1—E1—G1 will be enabled substantially simultaneously. This completes an electric path from the input coupling conductor 21 through the enabled amplifiers A1—E1—G1 to the utilization circuit.

Any of the other paths can be established in a comparable manner. However, since there can never be more than one of the control relays 41 to 48, inclusive, energized at any one appreciable interval of time, as was expalined above, it necessarily follows that only one of the eight paths can be established through the pyramidal routing circuit at any one time.

When it is desired to discontinue a path established through the routing circuit without establishing a different path, this can be accomplished by manually actuating the control switch 90 to disconnect battery 89 from the circuit for energizing the holding windings of the control relays 41 to 48, inclusive. This causes the particular energized control relay to release its armatures thereby disconnecting the +130-volt source 70 from the particular control leads 25 to 38, inclusive, to which it had been previously coupled. In turn, this causes the particular amplifiers A1 to G2, inclusive, that had been previously enabled to become disabled thereby rendering the previously established path non-conductive in respect to the applied intermediate frequency signals and thus restoring the routing circuit to its unoperated condition.

Alternatively, it may be desired to establish a different path through the routing circuit at nearly the same time that an established path is discontinued. This can be readily accomplished by simply operating the respective control key associated with the path that is to be now established. For example, let it be assumed that the first path is now being held established due to control relay 41 being held in an energized condition by its now closed holding circuit, and that it is now desired to establish in its stead the second path. Accordingly, the control key 62 is momentarily operated to close the circuit for energizing relay 42 which thereupon operates its armatures. The operation of its inner right armature prepares its holding circuit for closure upon the release of the outer right armature of relay 41 in the manner described above. At the same time, the operation of its outer right armature opens the holding circuit of relay 41. Also at the same time, the operation of its three left armatures prepares the enabling circuits of the amplifiers involved in establishing the second path.

During the time that relay 41 is held energized, the amplifiers A1—E1—G1 are held enabled due to source 70 being coupled over contacts *b*, *d*, and *f* to the control leads 25, 33, and 37 associated with these amplifiers. When the relay 41 releases its armatures in response to the opening of its holding circuit, amplifier A1 is disabled due to its associated control lead 25 being disconnected from the source 70 when the outer left armature of relay 41 is released from engagement with its contact *b* and moves into engagement with its contact *a*. In fact, both of the other previously enabled amplifiers E1—G1 are momentarily disabled during the brief armature transfer time of relay 41. Amplifier A2 is now enabled in lieu of amplifier A1 due to the fact that its associated control lead 26 is now connected over the contact *b* and the outer left armature of relay 42, through the contact *a* and the outer left armature of relay 41, and then through resistor 71 to the +130-volt source 70. The amplifier E1 is quickly re-enabled since its associated control lead 33 is now connected over the contact *d* and the middle left armature of relay 42, through the contact *c* and middle left armature of relay 41, and then through the resistor 72 to the source 70. Similarly, the amplifier G1 also is quickly re-enabled due to its associated control lead 37 being now connected through the contact *f* and the inner left armature of relay 42, over the contact *e* and the inner left armature of relay 41, and then through the resistor 73 to the source 70. Thus, the second transmission path is established immediately after the first transmission path is discontinued or disabled.

Any of the other transmission paths can be established in a similar manner, the chief difference being that the other +130-volt sources 81, 84, and 85 are used in place of the source 70 for enabling certain of the amplifiers. For example, let it be assumed that the first path has been established and that it is now desired to discontinue this path and to establish the fifth path. Accordingly, the control key 65 is momentarily operated to close the circuit for energizing the control relay 45 which thereupon operates its armatures, the inner right armature preparing its holding circuit for closure upon the release of the outer right armature of relay 41 which has had its holding circuit opened by the operation of the outer right armature of relay 45. The operation of the outer left armature of relay 45 connects a second source 81 of positive potential, having a magnitude of about 130 volts with respect to ground, through resistor 82 to contact *b* of relay 45 and then over control lead 29 to the amplifier C1. This serves to enable immediately the amplifier C1. The amplifier F1 is also immediately enabled due to its control lead 35 being connected over the contact *d* and middle left armature of relay 45 and then through resistor 83 to source 81. The operation of the inner left armature of relay 45 prepares a circuit for enabling amplifier G2 by connecting its control lead 38 over contact *f* of relay 45 and then through the contacts *e* and inner left non-operated armatures of relays 44—43—42 to the contact *e* of relay 41. When relay 41 releases its armatures, it disables the amplifiers A1—E1—G1 in the manner described above and also connects source 70 through the resistor 73 to the contact *e* of relay 41 thereby completing the circuit for enabling amplifier G1 and, consequently, establishing the fifth transmission path through the routing circuit.

It can be understood from the examples described above that, in switching from a lower numbered path to a higher numbered path, the operation of the armatures of the respective control relay associated with the higher numbered path prepares the higher numbered path for being established. However, this higher numbered path is not actually established until the control relay associated with the lower numbered path has released its armatures because it is the engagement of the released armatures of this relay with their associated outer contacts which actually completes the establishing of the higher numbered path. Since the armatures of this relay in releasing move out of engagement with their inner contacts before they move into engagement with their outer contacts, the previously established lower numbered path will always be disabled before the higher numbered path is established.

It is to be noted that since the actual switch between the paths occurs during the movement of the relay armatures from their inner contacts to their outer contacts, the actual switching time involved in changing from one such path to another is determined solely by the travel time of the armatures of the single relay associated with the lower numbered path. Considering the difficulties inherent in dealing with electric energy having frequencies in the microwave range and in view of the number of channels involved, it can be understood that this routing circuit provides extremely fast switching operations.

In switching from a higher numbered path to a lower numbered path, the switching operation is controlled by the control relay associated with the lower numbered path. This can be understood by assuming, for example, that the fifth path has already been established by the previous energization of its associated control relay 45 and that it is now desired to switch to the first path. Accordingly, the control key 41 is operated momentarily to close the circuit for energizing relay 41 which thereupon operates its armatures. When the inner left armature of relay 41 moves away from its contact *e*, it disconnects the source 70 from the enabling circuit, including the control lead 38, of amplifier G2 which thereupon becomes disabled thus immediately disabling the fifth path before its associated control relay 45 has released its armatures. At the end of its travel time, the inner left armature of relay 41 engages its contact *f* to connect the source 70 to the enabling circuit including the control lead 37, of amplifier G1 which thereupon becomes enabled.

The engagement of the outer and middle left armatures of relay 41 with their contacts *b* and *d*, respectively, connects the source 70 to the control leads 25 and 33 thereby enabling the amplifiers A1 and E1, respectively. This completes the establishing of the first transmission path through the routing circuit. It is to be noted that the fifth path is disabled before the first path is enabled due to the fact that the inner left armature of relay 41 disengages its contact *e* before it engages its contact *f*.

During this time, the operation of the outer right armature of relay 41 disconnects battery 89 from the holding circuit of relay 45 thereby causing relay 45 to release its armatures. The release of the inner right armature of relay 45 connects ground 80 to the operated inner right armature of relay 41 thereby completing the circuit for holding relay 41 energized. The release of the outer and middle armatures of relay 45 disconnects the source 81 from the control leads 29 and 35 associated with the amplifiers C1 and F1, respectively.

Switching from other higher numbered paths to other lower numbered paths can be performed in a similar manner. In every instance the previously established path will always be disabled before the new path is enabled which is the same sequence of switching operations that is followed in switching from a lower numbered path to a higher numbered path. Furthermore, under no circumstances will more than one transmission path be established through the routing circuit at any one time.

This embodiment of the invention, wherein any one of eight incoming signaling channels can be routed to a single outgoing channel, has been presented and described for the purpose of explaining the principles and features of operation of the invention. It is to be understood that the invention is not limited to routing only this particular number of incoming signaling channels but may be employed for routing either a larger or smaller number of incoming signaling channels. When the routing circuit of this invention is used with a smaller number of incoming channels, it does not require as many amplifiers as are contained in the pyramidal formation shown in Fig. 2. It also does not require as many control relays and control keys as are shown in Fig. 2 since only one such relay and key is needed for each incoming channel that is to be routed. Furthermore, not all of the transmission paths through the pyramidal formation will require as many as three amplifiers to establish them. This can be understood by considering as an example a circuit for selectively routing six incoming signaling channels, such as the routing circuit shown in Figs. 4 and 5.

Figure 4:
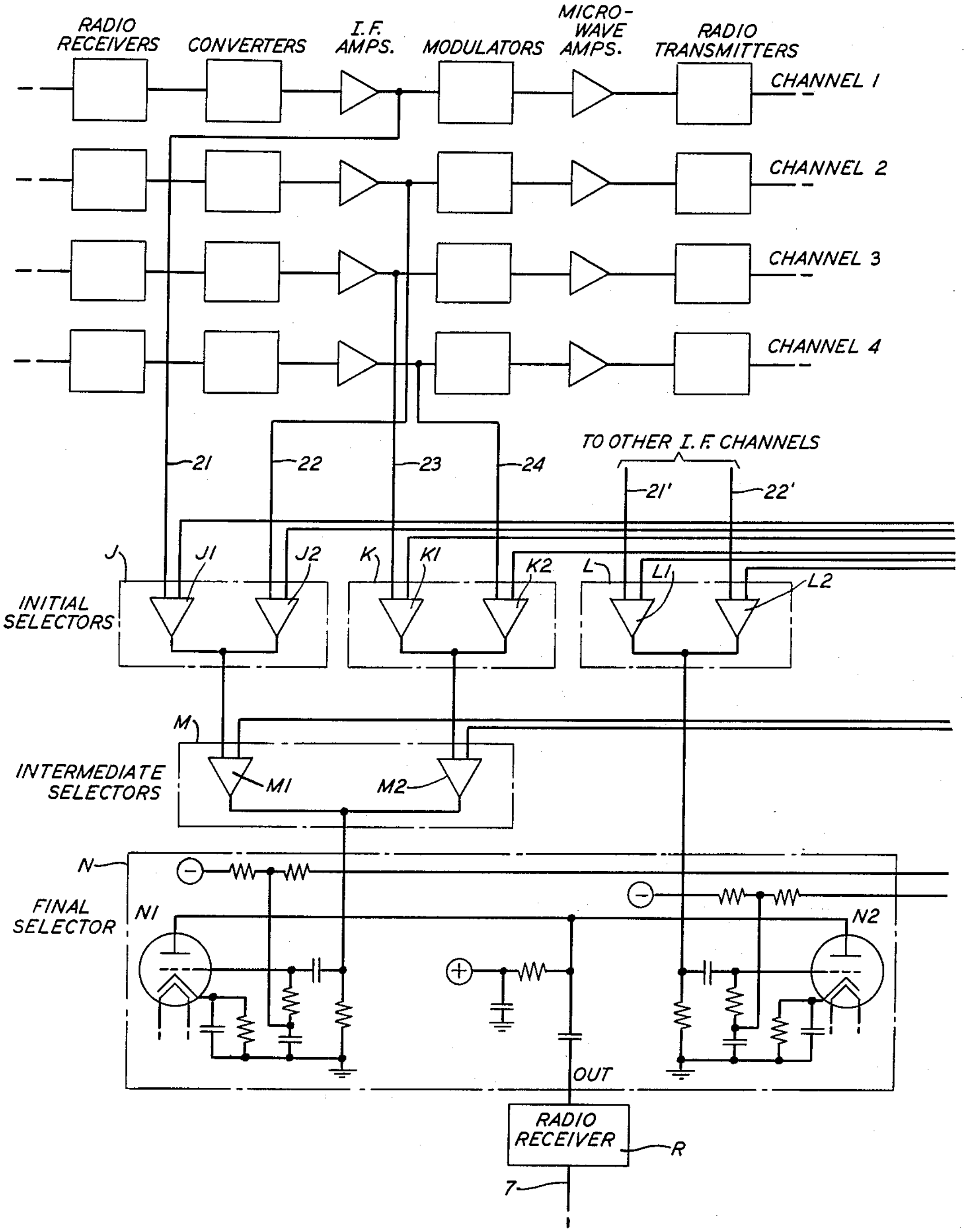
Fig. 4 illustrates a modification of that portion of the relay station equipment which is shown in Fig. 2.

In Fig. 4, the repeater 3 is shown to be provided with a routing circuit for selectively routing any one of six incoming signaling channels to the single outgoing, or utilization, circuit represented by the same radio receiver R and the same transmission line 7 that are also shown in Fig. 2. This routing circuit comprises an inverted pyramidal formation of electronic selector units J—K—L—M—N disposed in three ranks with the rank constituting the base toward the top of the figure and its apex at the bottom. It is to be noted that, although this routing circuit is similar to the routing circuit of Fig. 2 in that they both have only one final electronic selector unit at their apexes, the routing circuit shown in Fig. 4 differs in that the rank at its base includes three initial selector units J—K—L and its middle rank is constituted by only one intermediate selector unit M.

Like the selector units of Fig. 2, each of the selectors J—K—L—M—N in Fig. 4 comprises a pair of thermionic amplifiers J1—J2, K1—K2, L1—L2, M1—M2, and N1—N2, respectively, each amplifier being normally disabled and having a single input circuit and a single output circuit. The input circuits of the amplifiers J1—J2—K1—K2—L1—L2 in the initial selectors J—K—L are coupled to the intermediate frequency stages of six signaling channels in the repeater 3 by the same conductors 21—22—23—24—21′—22′ that are also shown in Fig. 2. The output circuits of each of these pairs of amplifiers are coupled together to provide a single output circuit for their respective associated selectors J—L—K.

The output circuits from the selectors J and K are coupled respectively to the input circuits of the amplifiers M1—M2 in the single intermediate selector M. The amplifiers M1—M2 have their outputs coupled together to provide a single output circuit for the selector M. The output circuit of the selector M is, in turn, coupled to the input circuit of the amplifier N1 in the final selector N. Since there is only one intermediate selector unit M in the middle rank, the output circuit of the selector L in the initial rank is coupled directly to the input circuit of the other amplifier N1 in the final selector N. The output circuits of the amplifiers N1—N2 are coupled together to provide a single output circuit for the final selector N. The output circuit from the final selector N is coupled to the utilization circuit represented by the radio receiver R and transmission line 7 which, as was described above, delivers applied signaling energy to the local transmitter 6 for transmission therefrom over an auxiliary outgoing signaling channel.

Any one of the six incoming signaling channels can be routed through the amplifiers J1 to N2, inclusive, by selectively enabling appropriate amplifiers. The particular thermionic amplifiers that must be enabled in order to establish each of the six available transmission paths through the routing circuit are indicated in the following table:

| Path | Input Coupling Conductor | Amplifiers to be Enabled |
|---|---|---|
| 1 | 21 | J1–M1–N1 |
| 2 | 22 | J2–M1–N1 |
| 3 | 23 | K1–M2–N1 |
| 4 | 24 | K2–M2–N1 |
| 5 | 21′ | L1–N2 |
| 6 | 22′ | L2–N2 |

Figure 5:
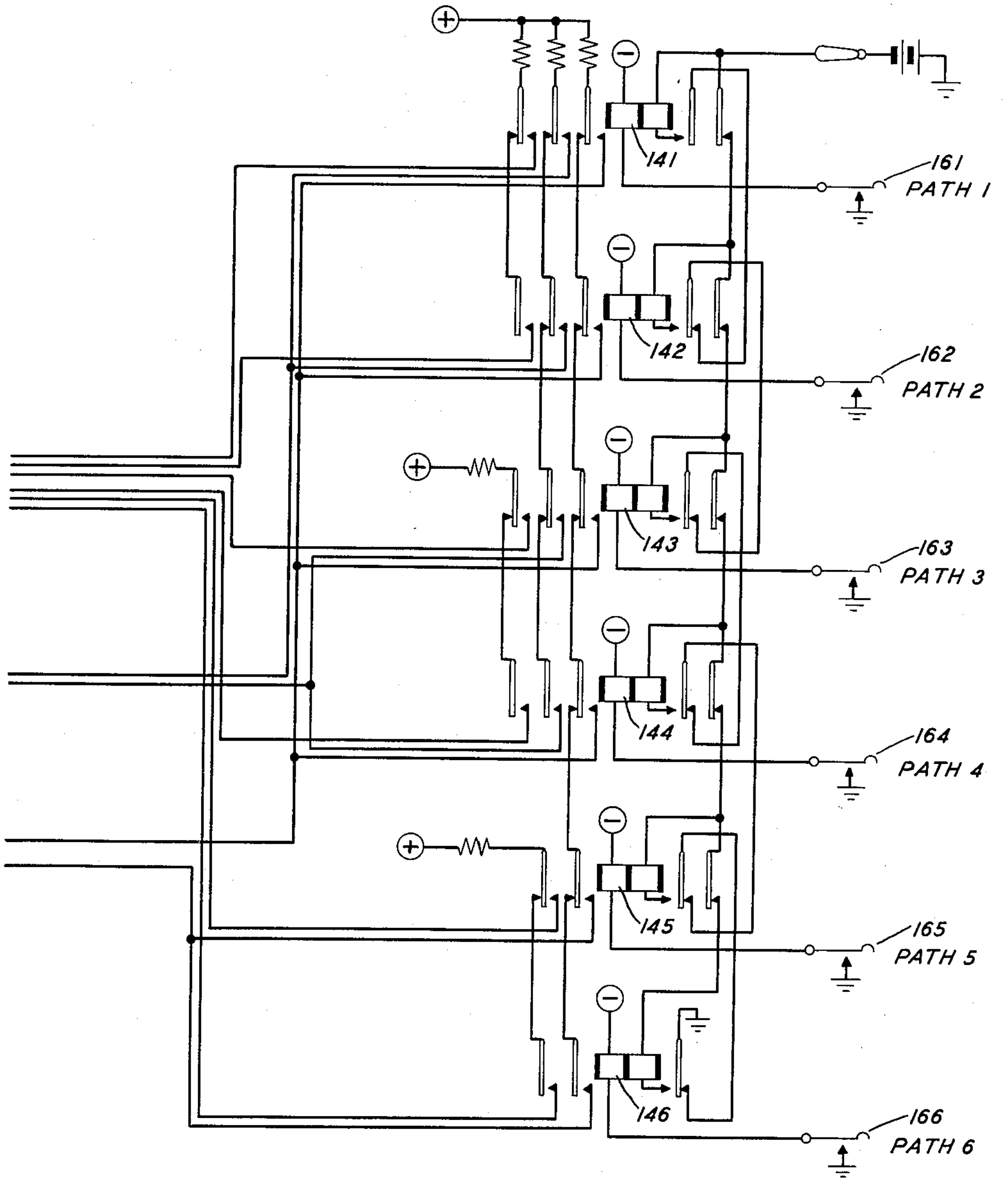
Fig. 5 is a circuit diagram of a modification of that portion of the relay station equipment which is shown in Fig. 3.

The enabling of the particular group of normally disabled amplifiers that is required in order to establish any one of the six transmission paths through the routing circuit of Fig. 4 is accomplished by selectively operating the appropriate control key in the group of six control keys 161 to 166, inclusive, shown in Fig. 5. When any one of the keys 161 to 166, inclusive, is manually operated momentarily, it closes the energizing circuit of its respective associated control relay 141 to 146, inclusive, which consequently operates its armatures. The operated relay armatures effect the enabling and disabling of the amplifiers in a manner similar to that described above for relays 41 to 48, inclusive, except that the operation of the armatures of either relay 145 or 146 causes only two amplifiers to be enabled instead of three. Like the first routing circuit described above, this second routing circuit permits only one transmission path to be established through it at any one time and, when a switch is made from one transmission path to another, the previously established path is always disabled before the next path is established.

When the routing circuit of this invention is used with a larger number of incoming signaling channels, such as sixteen, each of these channels can be selectively routed to the utilization circuit by using the pyramidal selectors of Fig. 2 combined with a second similar pyramidal formation of selector units and by also employing an additional single selector unit having two thermionic amplifiers similar to those described above. The single output circuit of one of the pyramidal formations is coupled to the single input circuit of one of the amplifiers in the additional selector unit, and the single output circuit of the other pyramidal formation is coupled to the single input circuit of the other amplifier in the additional selector unit. The single output circuit of the additional selector unit is coupled directly to the utilization circuit represented by the radio receiver R and the transmission line 7. Consequently, the final selector units of the two pyramidal formations may be considered as constituting a second rank of intermediate selectors, and the additional selector unit may be considered as constituting the single final selector unit at the apex of the single routing circuit constituted by the combined selector formations.

Any one of the sixteen available transmission paths through this routing circuit can be selectively established by selectively operating the appropriate control key in a group of sixteen control keys similar to those shown in Fig. 3. The operation of any one of these control keys effects the energization of an associated control relay in a group of sixteen control relays similar to those shown in Fig. 3 and causes it to operate its armatures. The operation of the armatures of any one of these control relays effects the enabling of four amplifiers, one in each rank of the combined groups of amplifiers and one in the single final selector unit, in a manner similar to that described above. In turn, the enabling of these amplifiers causes a transmission path to be established through the routing circuit in a manner corresponding to that described above.

It is to be understood that, in any embodiment of the invention, the control keys need not necessarily be located at the repeater station 3 but may, if desired, be located at a remote point, such as the main transmitting station 1. When the control keys are thus located at a remote point, they can be coupled to the energizing circuits of their respective associated control relays at the repeater station 3 by any suitable coupling means, such as direct-current telegraph circuits extending between the remote point, which may be the main transmitting station, and the repeater station 3.

It is also to be understood that the output circuit of the routing circuit need not always be coupled to a local transmitter but may instead be coupled to other types of utilization circuits. For example, it may be coupled to a spare microwave radio transmitter at the repeater station 3 similar to the transmitters 17—18—19—20 indicated in Fig. 2. In this case, if one of the regular outgoing microwave channels from the repeater station 3 should fail, the routing circuit may be employed to route signals, which are normally assigned for retransmission over the now impaired channel, to the auxiliary transmitter for transmission over its associated auxiliary microwave channel.

Various other modifications employing the principles and features of this invention may be made without exceeding its scope, which is to be limited only by the claims appended hereto.

What is claimed is:

1. In combination, in a multichannel radio relay signaling system having allotted thereto a plurality of main radiant energy signaling channels, said system including a plurality of main signaling stations having means for transmitting and receiving radiant energy signals over said main channels, a repeater station for repeating signals transmitted over said main channels, a local radio transmitting station having a radio transmitter, a transmission line connecting said local station to said repeater station, said system being characterized by having a routing circuit at said repeater station for selecting signals received thereat from any desired one of said main channels and for routing them for any desired length of time over said transmission line to said local station for retransmission by said radio transmitter, said routing circuit comprising a plurality of thermionic amplifiers disposed in several ranks, the number of amplifiers in successive ranks progressively diminishing for constituting a pyramidal formation of said amplifiers having a plurality of electric input paths at its base and a single electric output path at its apex, means for coupling said output path to said transmission line, a plurality of extracting means at said repeater station for continuously extracting signaling energy from each of said main channels separately, each of said extracting means having a separate electric output path, means for constantly coupling each of said output paths from said extracting means to a respectively different one of said input paths, a plurality of sources of biasing potential, means for constantly applying biasing potential from a respectively different one of said sources to each of said amplifiers for normally disabling all of said amplifiers, and control means for establishing any one of a number of available alternative electric paths through said pyramidal formation of amplifiers for any desired length of time, said control means including means for overcoming said biasing potential applied to certain of said amplifiers and for enabling only one amplifier in any one rank of said pyramidal formation at any one time and for any desired length of time.

2. In combination, in a multichannel radio relay signaling system having allotted thereto a plurality of main radiant energy signaling channels, said system including a plurality of main signaling stations having means for transmitting and receiving radiant energy signals over said main channels, a repeater station for repeating signals transmitted over said main channels, a local radio transmitting station having a radio transmitter, a transmission line connecting said local station to said repeater station, said system being characterized by having a routing circuit at said repeater station for selecting signals received thereat from any desired one of said main channels and for routing them for any desired length of time over said transmission line to said local station for retransmission by said radio transmitter, said routing circuit comprising a plurality of thermionic amplifiers disposed in several ranks, the number of amplifiers in successive ranks progressively diminishing for constituting a pyramidal formation of said amplifiers having a plurality of electric input paths at its base and a single electric output path at its apex, means for coupling said output path to said transmission line, a plurality of extracting means at said repeater station for continuously extracting signaling energy from each of said main channels separately, each of said extracting means having a separate electric output path, means for constantly coupling each of said output paths from said extracting means to a respectively different one of said input paths, a plurality of sources of biasing potential, means for constantly applying biasing potential from a respectively different one of said sources to each of said amplifiers for normally rendering all of said amplifiers non-conductive, a plurality of sources of enabling potential, a plurality of enabling circuits all being normally open, each of said amplifiers having at least one of said enabling circuits extending therefrom to at least one of said sources of enabling potential, control means for establishing any one of a number of available alternative electric paths through said pyramidal formation of amplifiers for any desired length of time, said control means including a plurality of electric relays, one for each of said paths through said pyramidal formation, each of said relays being normally unenergized, and selective energizing means for energizing only one of said relays at any one time, each of said relays having means actuated in response to the energization of the associated relay for closing respectively different groups of said enabling circuits for applying the respectively associated sources of enabling potential to the respective amplifiers associated therewith for overcoming the biasing potential applied thereto whereby said respectively associated amplifiers are rendered conductive, only one amplifier in any one rank of said pyramidal formation being rendered conductive at any one time.

3. A combination in accordance with claim 2 wherein said selective energizing means include a separate independent energizing circuit for each of said relays, all of said energizing circuits being normally open, selective means for closing any one of said energizing circuits for effecting the energization of the relay associated therewith, a holding circuit for maintaining energized for any desired length of time any one of said relays energized by said selective energizing means, certain portions of said holding circuit being common to more than one of said relays and other portions being respectively individual to each of said relays, each of said relays having means actuated in response to the energization of the associated relay for closing its respective independent portion of said holding circuit and for simultaneously opening part of said common portion of said holding circuit for effecting the de-energization of any one of said relays that has been previously energized, and second control means for opening a portion of said holding circuit common to all of said relays for effecting the de-energization of any energized relay at any time.

4. A combination in accordance with claim 2 wherein said relays are provided with a holding circuit for holding only one of said relays energized at any one time, said holding circuit comprising contacts on all of said relays connected in series, the contact on the relay to be held being closed by the actuation of that relay and those on the other of said relays being closed by the release of such relays.

References Cited in the file of this patent

UNITED STATES PATENTS

| | | |
|---|---|---|
| 897,662 | Roberts | Sept. 1, 1908 |
| 1,765,538 | Nelson | June 24, 1930 |
| 1,786,805 | Wensley | Dec. 30, 1930 |
| 1,967,887 | Johnston | July 24, 1934 |
| 2,332,300 | Cook | Oct. 19, 1943 |
| 2,498,695 | McWhirter et al. | Feb. 28, 1950 |

FOREIGN PATENTS

| | | |
|---|---|---|
| 108,213 | Great Britain | Aug. 2, 1917 |
| 344,444 | Great Britain | Feb. 27, 1931 |
| 348,543 | Great Britain | May 12, 1931 |